(12) United States Patent
Schuessler

(10) Patent No.: US 7,290,717 B2
(45) Date of Patent: Nov. 6, 2007

(54) SYSTEM AND METHOD FOR MACHINE READABLE SYMBOL BACKUP FOR RADIO FREQUENCY IDENTIFICATION TAGS

(75) Inventor: Frederick Schuessler, Baiting Hollow, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 11/157,927

(22) Filed: Jun. 22, 2005

(65) Prior Publication Data

US 2006/0289645 A1    Dec. 28, 2006

(51) Int. Cl.
*G06K 19/06* (2006.01)
*G06K 19/00* (2006.01)

(52) U.S. Cl. ...................... 235/492; 235/487
(58) Field of Classification Search ............... 235/375, 235/380, 381, 383, 487, 492
See application file for complete search history.

(56) References Cited

U.S. PATENT DOCUMENTS

| | | | | |
|---|---|---|---|---|
| 4,827,114 A | * | 5/1989 | Blachon | ............ 235/487 |
| 5,544,749 A | * | 8/1996 | Watts | ............ 206/459.5 |
| 6,222,452 B1 | * | 4/2001 | Ahlstrom et al. | ........ 340/572.1 |
| 6,318,636 B1 | | 11/2001 | Reynolds et al. | |
| 6,371,375 B1 | | 4/2002 | Ackley et al. | |
| 6,830,181 B1 | | 12/2004 | Bennett | |
| 2005/0108912 A1 | * | 5/2005 | Bekker | ............ 40/633 |

OTHER PUBLICATIONS

"EPC™ Tag Data Standards, Version 2.0, Rev. 1.0, Standard Specification," EPCglobal®, 93 pages (May 11, 2005).
International Search Report cited in Application No. PCT/US 06/18750 dated Nov. 22, 2006.

* cited by examiner

*Primary Examiner*—Daniel Stcyr
*Assistant Examiner*—April Taylor
(74) *Attorney, Agent, or Firm*—Sterne, Kessler, Goldstein & Fox PLLC

(57) ABSTRACT

Methods, systems, and apparatuses for obtaining data from radio frequency identification (RFID) tags are described. A read of data stored in a RFID tag is initiated. It is determined that the read failed. A machine readable symbol of the RFID tag is scanned to identify the RFID tag. The read and scan can be performed by a multi-mode reader device or by separate devices. In an aspect, a portion of the scanning operation can be performed before it is determined that the read failed. In a further aspect, a reversible obscuration partially or entirely prevents decoding of the machine readable symbol. The obscuration is reversed to expose the machine readable symbol prior to scanning the machine readable symbol. An indication can be provided on the RFID tag to indicate to an operator that the machine readable symbol is present.

20 Claims, 10 Drawing Sheets

SYSTEM AND METHOD FOR MACHINE READABLE SYMBOL BACKUP FOR RADIO FREQUENCY IDENTIFICATION TAGS

BACKGROUND OF THE INVENTION

1. Field of the Invention

The present invention relates to the obtaining of data from radio frequency identification (RFID) tag devices.

2. Background Art

Radio frequency identification (RFID) tags are electronic devices that may be affixed to items whose presence is to be detected and/or monitored. The presence of an RFID tag, and therefore the presence of the item to which the tag is affixed, may be checked and monitored by devices known as "readers." Readers typically transmit radio frequency signals to which the tags respond. Each tag can store a unique identification number. The tags respond to the reader transmitted read signals by providing their identification number, bit-by-bit, so that they can be identified.

Tags sometimes fail to respond to read requests for various reasons, including defects or damage to the tags. In such situations, it may be necessary for a human operator to hand-enter data printed on the failed tag into a system so that the tag can be identified. However, such a backup system for failed reads of tags is inefficient. For example, the full serialized identifier provided by EPC RFID tags requires at least 30 digits to be represented in human-readable form. Entering in such long strings of data by hand is error prone and time consuming. Thus, the hand-entering in of printed data from a tag is not necessarily a reliable or cost-effective backup system for read failures.

Some tags have barcodes associated with them for backup to failed tag reads. For such a tag, the barcode is scanned while the tag is read. If the tag fails to respond to a read request, the scanned barcode information can be used to identify the tag. However, such an implementation has inefficiencies. For example, a large amount of power is required to both read a tag and scan a barcode each time a tag is desired to be identified. An increase in data transmission traffic occurs when duplicate data resulting from a successful tag read and barcode scan is decoded. Furthermore, mismatched information can result when a tag that responds to a read signal is different from the tag having its barcode scanned.

Thus, what is needed is a more efficient, reliable, and cost-effective backup identification system for failed tags.

BRIEF SUMMARY OF THE INVENTION

Methods, systems, and apparatuses for obtaining data from radio frequency identification (RFID) tags are described.

In an embodiment of the present invention, a read of data stored in a RFID tag is initiated. If it is determined that the read failed, a machine readable symbol of the RFID tag is scanned to identify the RFID tag.

In an embodiment, the read and scan are performed by a multi-mode reader device. In an alternative embodiment, the read and scan are performed by separate devices.

In a further embodiment, at least a portion of the scan is performed before it is determined that the read failed.

In a still further embodiment, a reversible obscuration at least partially covers the machine readable symbol. The obscuration is reversed to expose the machine readable symbol prior to scanning the machine readable symbol. In an embodiment, an indication is provided on the RFID tag to indicate to an operator that the machine readable symbol is present, such as may be needed when the machine readable symbol is completely obscured.

Embodiments of the present invention include RFID tag devices. In an embodiment, a tag includes a substrate, an antenna on the substrate, and an electrical circuit on the substrate that includes identifying data for the RFID tag device. The electrical circuit is coupled to the antenna and is capable of backscatter transmitting the identifying data in response to a request from a reader. The tag further has a machine readable symbol associated therewith, and has a reversible obscuration that at least partially prevents the machine readable symbol from being capable of being scanned.

Embodiments of the present invention also include reader and scanner devices. In an example multi-mode device embodiment, the multi-mode device includes a housing, an antenna mounted in the housing, and an actuatable scanner mounted in the housing capable of scanning a machine readable symbol. The device further includes a reader module in the housing coupled to the antenna. The reader module is capable of generating read signals that are transmitted by the antenna to tags, and is capable of decoding read response signals from the tags received by the antenna. The device further includes a scan module in the housing coupled to the scanner. The scan module is capable of actuating the scanner to image a machine readable symbol, and is capable of decoding imaging results signals received by the scanner.

Various embodiments of the multi-mode device are configured to read tags and scan machine readable symbols associated with the tags in numerous ways, as described further below.

These and other advantages and features will become readily apparent in view of the following detailed description of the invention. Note that the Summary and Abstract sections may set forth one or more, but not all exemplary embodiments of the present invention as contemplated by the inventor(s).

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

FIG. 1 illustrates an environment where RFID readers communicate with an exemplary population of RFID tags, according to an embodiment of the present invention.

FIGS. 2, 3A, and 3B show plan views of an example RFID tags, according to embodiments of the present invention.

The present invention will now be described with reference to the accompanying drawings. In the drawings, like reference numbers indicate identical or functionally similar

DETAILED DESCRIPTION OF THE INVENTION

Introduction

The present invention relates to the obtaining of data from radio frequency identification (RFID) tags. According to an embodiment, a tag is attempted to be read to obtain data. If the tag fails to respond properly to the read, an obscuration disabling a machine readable symbol associated with the tag is reversed, and the machine readable symbol is scanned to obtain data regarding the tag. In another embodiment, the tag is attempted to be read simultaneously with a scan of the machine readable symbol. If data from the read attempt is successfully obtained, the scan can be terminated and any data obtained by the scan can be discarded. Alternatively, if data from the scan attempt is successfully obtained, the read can be terminated and any data obtained from the read can be discarded. Alternatively, the data obtained from the read or scan, whichever successfully obtains data first, can be used. Further embodiments are described in detail herein.

Note that "scanning a machine readable symbol" generally refers to the imaging of a machine readable symbol and the decoding of the image received from the machine readable symbol. The imaging may be performed by an image capturing device (e.g., camera) or laser scanner device, for example,.

It is noted that references in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Example Tag Embodiments

Figure 1:
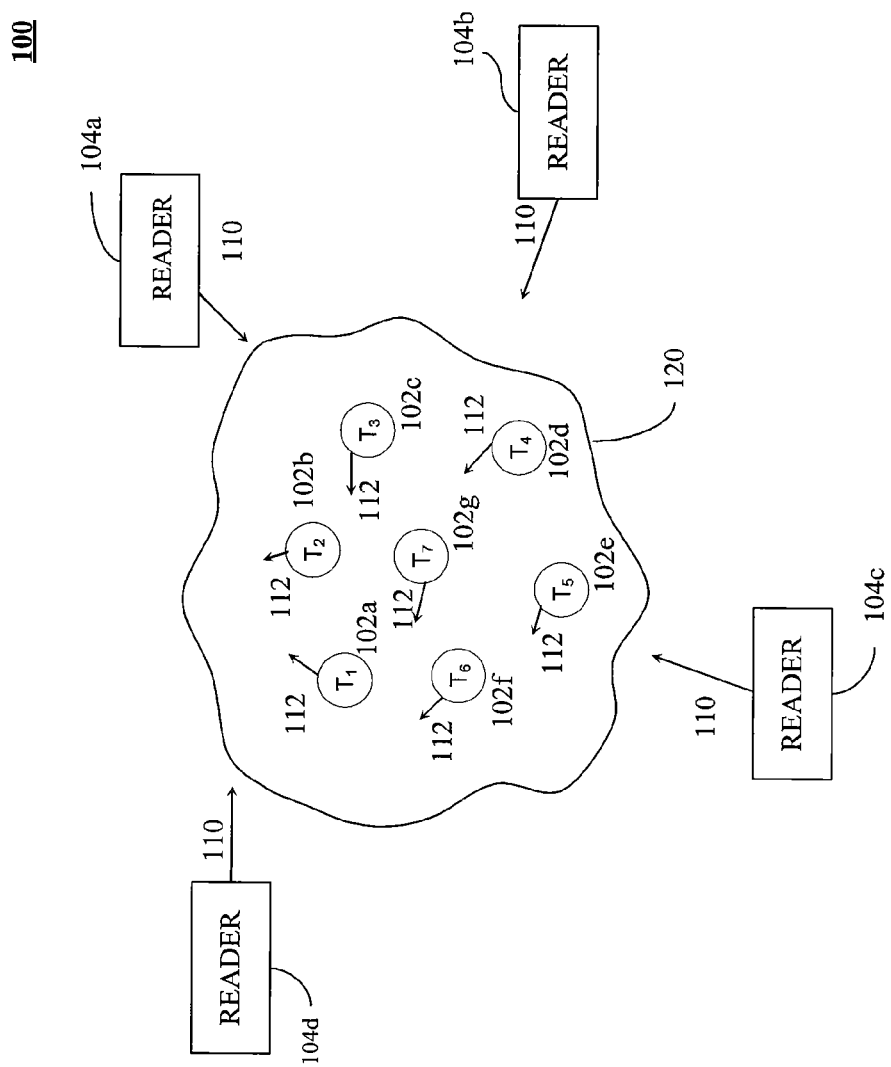

Before describing embodiments of the present invention in detail, it is helpful to describe an example environment in which the invention may be implemented. FIG. 1 illustrates an environment 100 where RFID tag readers 104 communicate with an exemplary population 120 of RFID tags 102. As shown in FIG. 1, the population 120 of tags includes seven tags 102a-102g. According to embodiments of the present invention, a population 120 may include any number of tags 102. In some embodiments, a very large numbers of tags 102 may be included in a population 120 of tags, including hundreds, thousands, or even more.

Environment 100 also includes readers 104a-104d. Readers 104 may operate independently or may be coupled together to form a reader network. A reader 104 may be requested by an external application to address the population of tags 120. Alternatively, reader 104 may have internal logic that initiates communication, or may have a trigger mechanism that an operator of reader 104 uses to initiate communication.

As shown in FIG. 1, a reader 104 transmits an interrogation signal 110 having a carrier frequency to the population of tags 120. The reader 104 operates in one or more of the frequency bands allotted for this type of RF communication. For example, frequency bands of 902-928 MHz and 2400-2483.5 MHz have been defined for certain RFID applications by the Federal Communication Commission (FCC). Furthermore, due to regulatory or operational considerations, reader 104 may change carrier frequency on a periodic basis (e.g., ranging from 50 to 400 milliseconds) within the operational band. In these "frequency hopping" systems, the operational band is divided into a plurality of hopping channels. For example, the 902-928 MHz frequency band may be divided into 25 to 50 hopping channels, depending upon the maximum bandwidth defined for each hopping channel. The maximum allowable bandwidth for each hopping channel may be set by local or national regulations. For example, according to FCC Part 15, the maximum allowed bandwidth of a hopping channel in the 902-928 MHz band is 500 kHz. Each hopping channel is approximately centered around a specific frequency, referred to herein as the hopping frequency.

A frequency hopping reader hops between hopping frequencies according to a pseudorandom sequence. Each reader 104 typically uses its own pseudorandom sequence. Thus, at any one time, one reader 104a may be using a different carrier frequency than another reader 104b.

Various types of tags 102 transmit one or more response signals 112 to an interrogating reader 104 in a variety of ways, including by alternatively reflecting and absorbing portions of signal 110 according to a time-based pattern or frequency. This technique for alternatively absorbing and reflecting signal 110 is referred to herein as backscatter modulation. Reader 104 receives response signals 112, and obtains data from response signals 112, such as an identification number of the responding tag 102.

Figure 2:
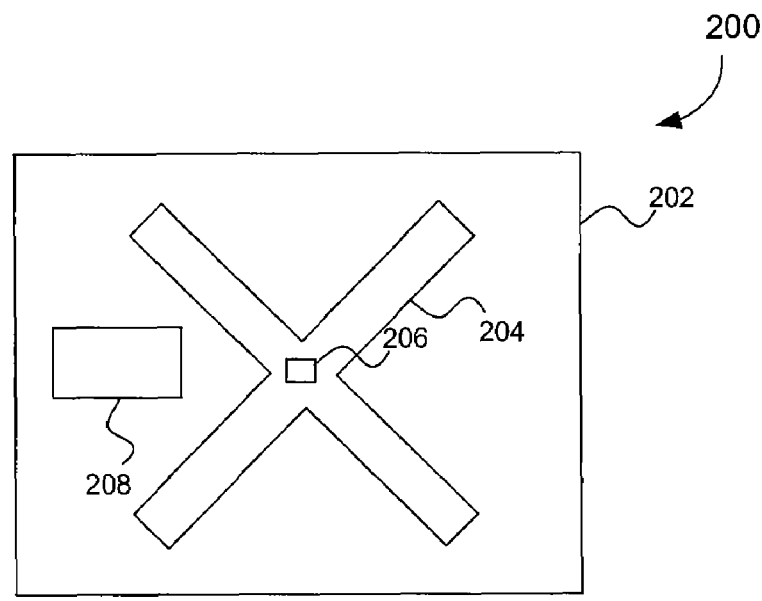

The present invention is applicable to any type of RFID tag. FIG. 2 shows a plan view of an example radio frequency identification (RFID) tag 200. Tag 200 includes a substrate 202, an antenna 204, and an integrated circuit (IC) 206. Antenna 204 is formed on a surface of substrate 202. Antenna 204 may include any number of one or more separate antennas. IC 206 includes one or more integrated circuit chips/dies, and can include other electronic circuitry. IC 206 is attached to substrate 202, and is coupled to antenna 204. IC 206 may be attached to substrate 202 in a recessed and/or non-recessed location. IC 206 controls operation of tag 200, and transmits signals to, and receives signals from RFID readers using antenna 204. Tag 200 may additionally include further elements, including an impedance matching network and/or other circuitry. The present invention is applicable to tag 200 (e.g., a semiconductor type tag), and to other types of tags, including surface wave acoustic (SAW) type tags.

Tag 200 may be affixed directly to, or may be associated with (e.g., located nearby), any item or object and/or container or other mount, support, or other structure associated with the item or object. Tag 200 may be any type of RFID electronic device that responds to wireless interrogations, including a loose tag, a hanging tag, and a label having a release liner for removal to attach the label to an item or object. Embodiments of the present invention can be implemented in a variety of environments, including warehouses, retail, logistics, healthcare, and any other environment.

Figure 3A:
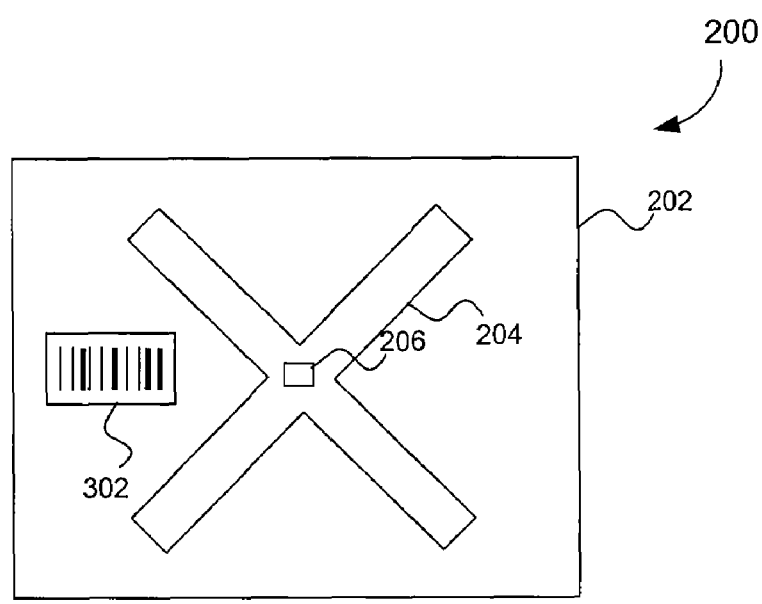

As shown in FIG. 2, tag 200 further includes an obscuration 208. Obscuration 208 partially or fully blocks or masks a machine readable symbol on tag 200, so that the machine readable symbol cannot be successfully scanned to recover data encoded therein without first interacting with obscuration 208 to reveal machine readable symbol. FIG. 3A shows tag 200 having a machine readable symbol 302 visible thereon after reversal of obscuration 208. Because obscuration 208 has been reversed (e.g., removed from tag 200), machine readable symbol 302 can be scanned, and data encoded therein can be recovered. Depending on the location of machine readable symbol 302, obscuration 208 can be located on a tag (as shown in FIG. 2), or can be otherwise associated with the tag.

Obscuration 208 can be any material or other form of obscuration that partially or fully blocks or masks machine readable symbol 302, to prevent machine readable symbol 302 from being read, until obscuration 208 is reversed. For example, obscuration 208 can be an opaque paper overlay, a scratch-off coating, an ink that can be wiped off, or any other obscuration technique that can be undone. In a partial obscuring embodiment, obscuration 208 causes insufficient optical contrast for at least one or more of the bars, modules, etc., of machine readable symbol 302. Machine readable symbol 302 can be printed in such a manner that a further application of chemicals or heat is required in order to make the symbol completely visible to a scanner. In such an embodiment, obscuration 208 may be a portion of tag 200. For example, machine readable symbol 302 may be imbedded in a layer of tag 200, and thus a portion (e.g., a layer) of tag 200 may need to be peeled away to reveal machine readable symbol 200. Such an action may or may not impair operation of tag 200. For example, obscuration 208 may include all or a portion of antenna 204. Antenna 204 may need to be peeled away to reveal machine readable symbol 302 underneath. In any event, machine readable symbol 302 cannot be scanned until an operator takes some action to remove obscuration 208 or otherwise reveal machine readable symbol 302, such as by pulling a tab to remove the paper overlay, scratching off a coating, wiping off an ink, applying a chemical, applying heat, causing an "invisible ink" to appear, etc.

Figure 3B:
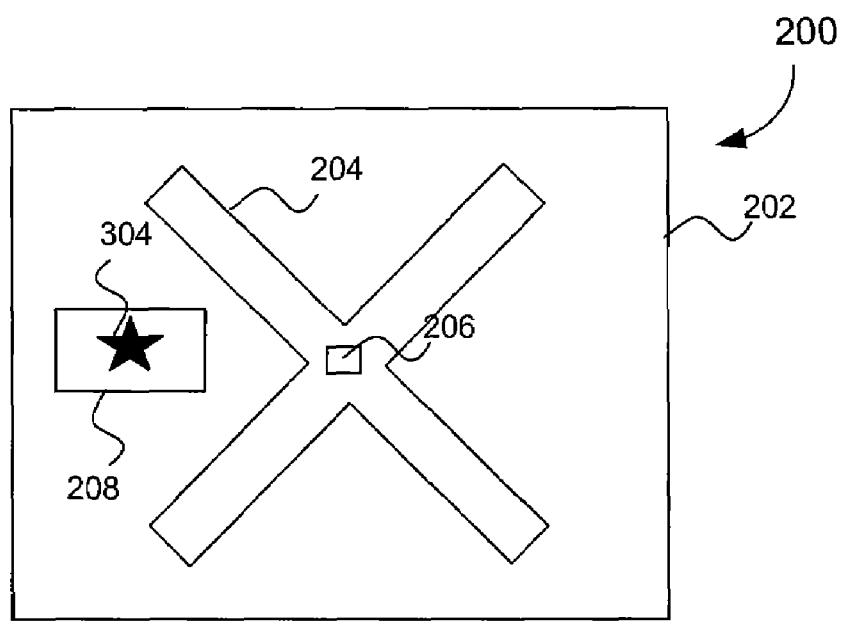

In an embodiment where machine readable symbol 302 is partially or completely invisible to the operator due to obscuration 208 (unless action is taken to reveal it), it may be advantageous to provide an optical indication to the operator that machine readable symbol 302 is present. For example, as shown in FIG. 3B, a small logo or image 304 is associated with tag 200, according to an embodiment of the present invention. Image 304 indicates the presence of an obscured machine readable symbol 302 to an operator. In the example of FIG. 3B, image 304 is shown as a five-pointed star image. Image 304 can include text, graphics, or any combination thereof. As shown in the example of FIG. 3B, image 304 can be printed directly on obscuration 208. Alternatively, image 304 can be present elsewhere on tag 200, or can be located elsewhere nearby tag 200.

In tests of RFID tag populations, an undesired amount of tag failures have been reported, where some tags fail to respond to reader interrogations. Thus, according to embodiments of the present invention, having machine readable symbol 302 on a tag 200 serves as a backup in the event that tag 200 fails to respond to an interrogation for data by a reader. Thus, if tag 200 fails to respond to a read request, information about an item associated with tag 200 (such as an identification number) is still recoverable from machine readable symbol 302, as well as information associated with the item that may be stored in a database (associated with the identification number).

In embodiments, machine readable symbol 302 can include any type of machine readable symbology, including linear barcodes (e.g., UPC, EAN, Code 39, and Code 93i), multi-row or stacked barcodes (e.g., PDF-417 and Code 49), composite codes (e.g., EAN.UCC composite), and area or matrix codes (e.g., Code One, Vericode, Datacode, and MAXICODE). Machine readable symbol 302 can be attached to or formed on tag 200 in any manner, including conventional ways such as printing or silk screening directly onto substrate 202, printing machine readable symbol 302 on a label (e.g., sticker) that is applied to substrate 202, or any other way.

In an embodiment, the data encoded in machine readable symbol 302 is the same as data stored in tag 200, such as the identification number of tag 200. In such an embodiment, the item with which tag 200 is associated can be handled in essentially the same way whether the RFID tag was readable or not (e.g., whether or not machine readable symbol 302 had to be uncovered and scanned due to a read failure) because the same data can be obtained either way (i.e., by scanning or reading). In another embodiment, the data encoded in machine readable symbol 302 may be partially or wholly different from that stored in tag 200. For example, the data may be different merely to aid in tracking tag failure rates. In still another embodiment, the data encoded in machine readable symbol 302 may not directly represent the data stored in tag 200, but may be indirectly related to it. For example, retail applications might literally encode, in a UCC-compliant backup barcode, product identification and serialization using Application Identifiers "01" and "21" (respectively), whereas the EPC tag format, for a 64-bit tag, does not have the capacity to literally represent that data, and uses a different scheme that requires a lookup table.

In an embodiment, obscuration 208 is reversed only if a read of tag 200 fails. Thus, in such an embodiment, machine readable symbol 302 can only be scanned if tag 200 fails to respond to a read request.

Example Reader System and Apparatus Embodiments

Figure 4:
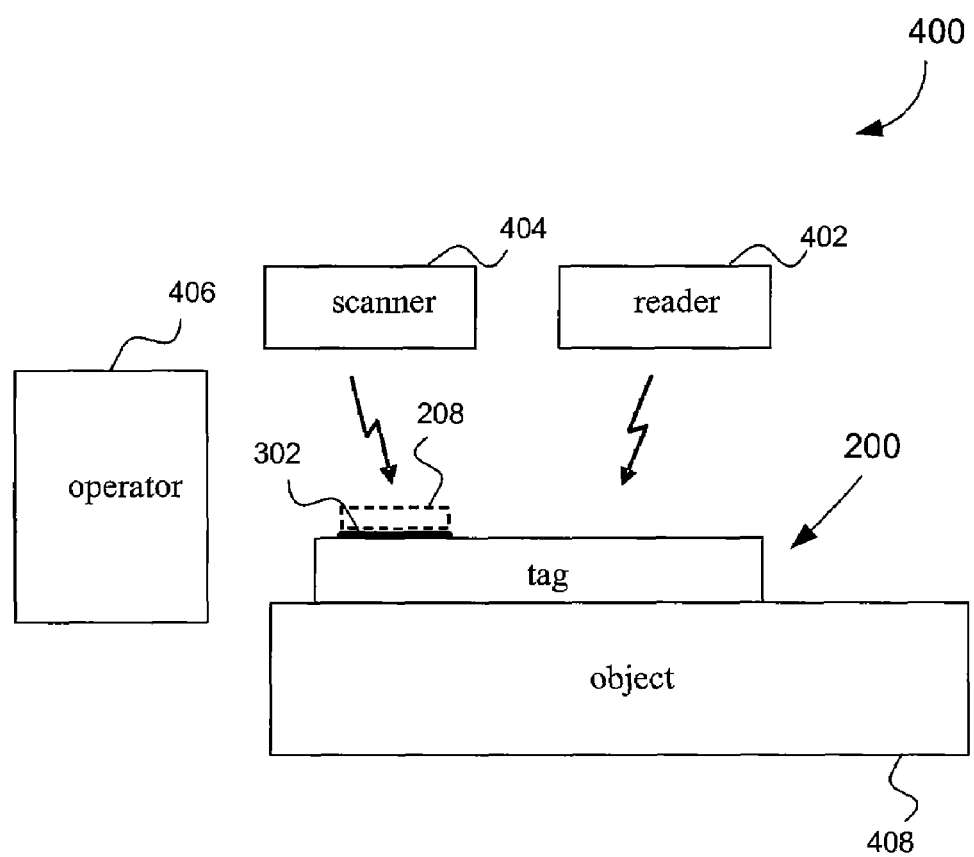
FIG. 4 shows a tag identification system, according to an embodiment of the present invention.

FIG. 4 shows a tag identification system 400, according to an embodiment of the present invention. System 400 includes an RFID reader 402, a scanner 404, and an operator 406. In the example of system 400, it is desired to identify tag 200, and thereby identify an object 408 to which tag 200 is associated. In an embodiment, operator 406 is a human operator. Alternatively, the functions described herein for operators can be performed in an automated manner.

As shown in FIG. 4, RFID reader 402 attempts to read tag 200 by transmitting a read signal 410 to tag 200. However, tag 200 may fail to respond properly to read signal 410. Thus, according to an embodiment of the present invention, operator 406 reveals obscuration 208 from tag 200 (e.g., removes a pull-tab) to fully expose machine readable symbol 302. Scanner 404 scans the unobscured machine readable symbol 302 to obtain the data encoded therein, which can be used to identify tag 200 (and object 408) and/or can be used for other purposes.

In the example of FIG. 4, RFID reader 402 may be any type of reader, including hand-held or stationary. Furthermore, scanner 404 may be any type of scanner, including hand-held or stationary, and can be a barcode type of scanner, or other type.

Figure 5:
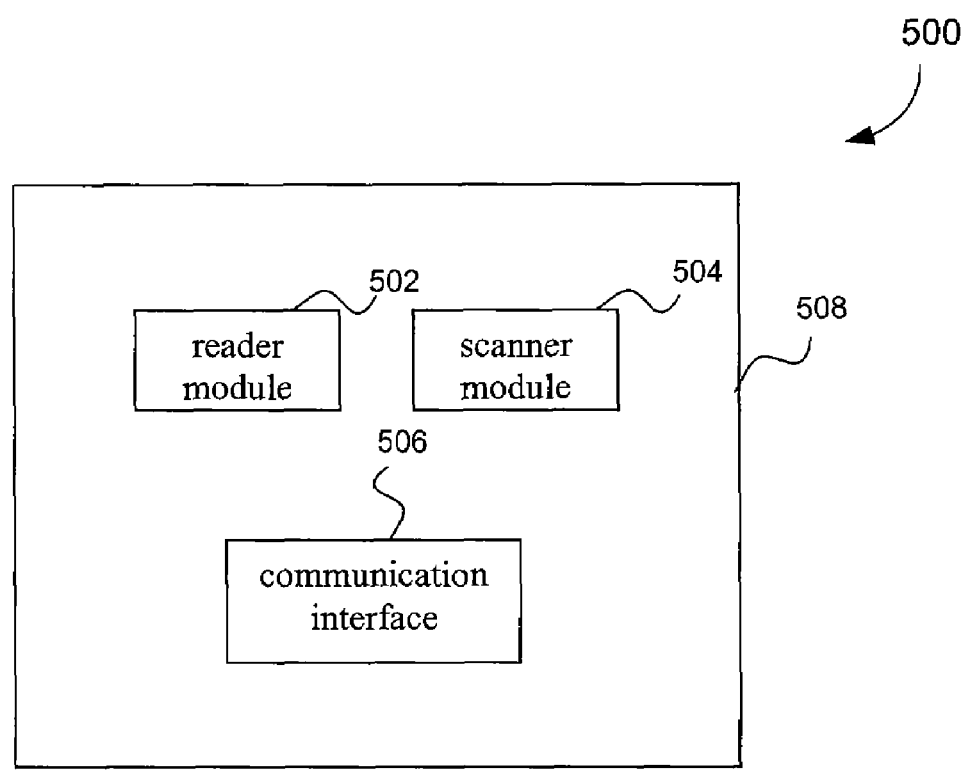
FIG. 5 shows a multi-mode reader, according to an embodiment of the present invention.

FIG. 5 shows an example multi-mode reader 500, according to an embodiment of the present invention. Multi-mode reader 500 includes functionality of RFID reader 402 and scanner 404, and thus can read tags and scan machine readable symbols. Thus, in an embodiment, multi-mode reader 500 can perform the functions of reader 402 and scanner 404 described above with respect to FIG. 4. In embodiments, multi-mode reader 500 can be a hand-held reader or a stationary reader.

As shown in FIG. 5, multi-mode reader 500 includes a reader module 502, a scanner module 504, a communication module 506, and a housing 508. Housing 508 contains reader module 502, scanner module 504, and communication module 506. Reader module 502 includes any logic and/or functional components necessary for reading tags. Thus, in embodiments, reader module 502 may include an antenna, a transmitter, a receiver, storage, and control logic for communicating with tags, for example. Reader module 502 enables multi-mode reader 500 to read tags according to any communication protocol, as desired for the particular application. Example such protocols include binary protocols, tree traversal protocols, slotted aloha protocols, and those required by the following standards: Class 0; Class 1; and Gen 2. Any future developed communication algorithms/protocols are also within the scope and spirit of the present invention.

Scanner module 504 includes any logic and/or functional components for scanning machine readable symbols. For example, scanner module 504 may include an imaging scanner (e.g., an LED illumination source with a charge-coupled device (CCD) detector) or a laser scanner (e.g., a semiconductor laser illumination source with sensor or photodetector), and any required optics. Furthermore, scanner module 504 may include logic for processing, including decoding a machine readable symbol.

For example, reader module 502 and scanner module 504 may each include software, hardware, and/or firmware, or any combination thereof, for performing their respective read and scan functionalities. Reader 500 can further include one or more storage devices for storing information, such as data resulting from reads and scans, including memory components, disc-based storage, magnetic storage devices, optical storage, etc. Furthermore, reader 500 can include a user interface accessible on housing 508, such as including a keyboard, display, graphical user interface (GUI), pointing device, and/or other visual and/or audio indicators, for interacting with reader 500 as needed.

Communication module 506 is optional. When present, communication module 506 can be used to receive data from an external entity (such as a computer system), and to transmit data to the external entity. Communication module 506 may provide a wired or wireless interface with the external entity. Furthermore, in an embodiment, reader 500 may include a power source, such as a battery.

Figure 6:
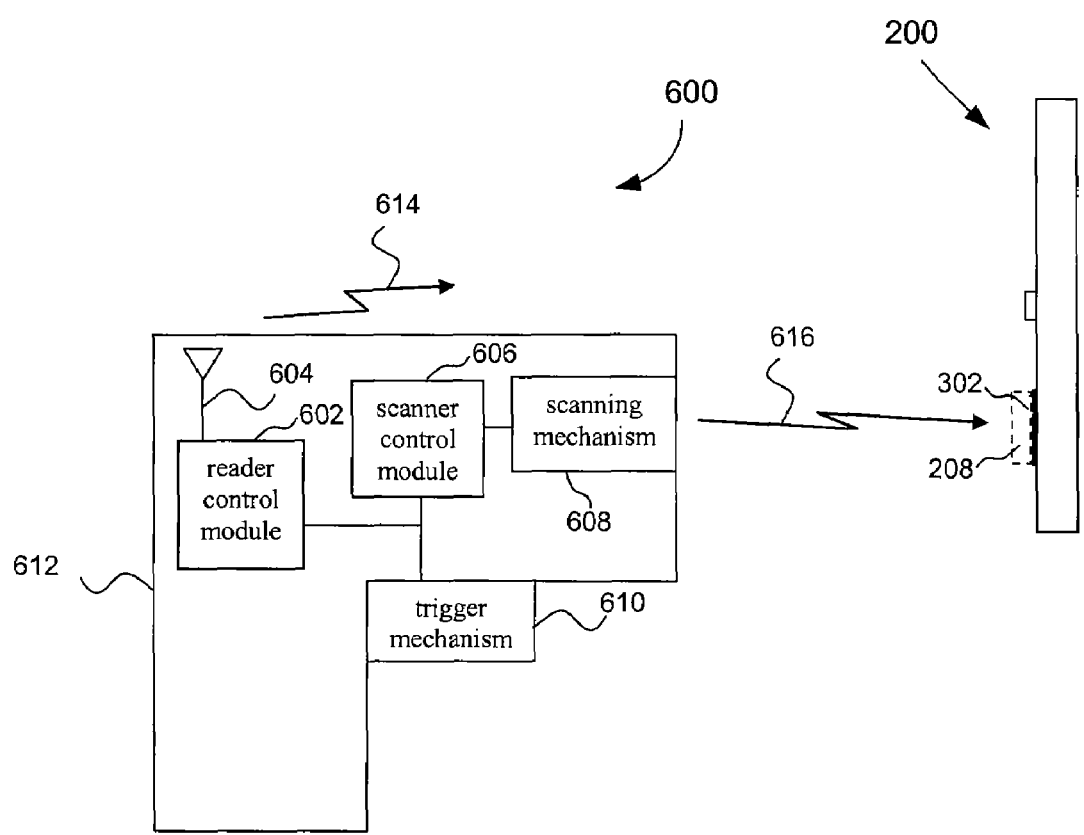
FIG. 6 shows an example hand-held multi-mode reader, according to an embodiment of the present invention.

FIG. 6 shows an example multi-mode reader 600 that is a hand-held implementation of reader 500, according to an example embodiment of the present invention. As shown in FIG. 6, hand-held multi-mode reader 600 includes a reader control module 602, an antenna 604, a scanner control module 606, a scanning mechanism 608, a trigger mechanism 610, and a housing 612. Reader module 602, antenna 604, scanner control module 606, scanning mechanism 608, and trigger mechanism 610 are mounted in housing 612. In the example of FIG. 6, housing 612 of reader 600 has a form-factor that is adapted to be held in the hand of a human operator (not shown in FIG. 6), but can alternatively have other shapes.

Reader control module 602 generates a read or interrogation signal 614 that is transmitted to tag 200 by antenna 604. Reader control module 604 also receives response signals from tags through antenna 604, and processes the response signals.

Scanner control module 606 generates a control signal to activate scanning mechanism 608, to cause scanning mechanism 608 to perform imaging 616 of machine readable symbol 302, when revealed. Scanner control module 606 also receives results of imaging 616 from scanning mechanism 608, and processes the results. Scanning mechanism 608 can be any type of scanner mechanism, including an imaging scanner mechanism (e.g., an LED illumination source with a charge-coupled device (CCD) detector) or a laser scanner mechanism (e.g., a semiconductor laser illumination source with sensor or photodetector), and any required optics.

In the embodiment of FIG. 6, hand-held multi-mode reader 600 includes trigger mechanism 610. In an embodiment, trigger mechanism 610 is a trigger-shaped switch, one or more buttons, or other mechanism that an operator of reader 600 can use to initiate a read and/or scan of tag 200 by reader 600. In another embodiment, a software command or other initiating event is used to initiate a read and/or scan of tag 200 by reader 600.

Further operational characteristics for embodiments of readers 500 and 600 are described in the following section.

Example Reader Operational Embodiments

Dual-mode reader 600 of FIG. 6 can be configured to attempt to both read tag 200 and scan a machine readable symbol 302 of tag 200 whenever trigger mechanism 610 is activated (e.g., is "pulled"). However, such a configuration can have inefficiencies. For example, an increase in power consumption can result when both reader and scanner components are energized by each trigger event. This can reduce the lifespan of a battery of reader 600, when present. Furthermore, this can lead to an increase in communication traffic used for the transmission of duplicate data from the reader that is recovered from the separate read and scan processes. Still further, this can possibly lead to the obtaining of mismatched tag information if the machine readable symbol that is scanned is associated with a tag different from the tag that responds to the read.

Figure 7:
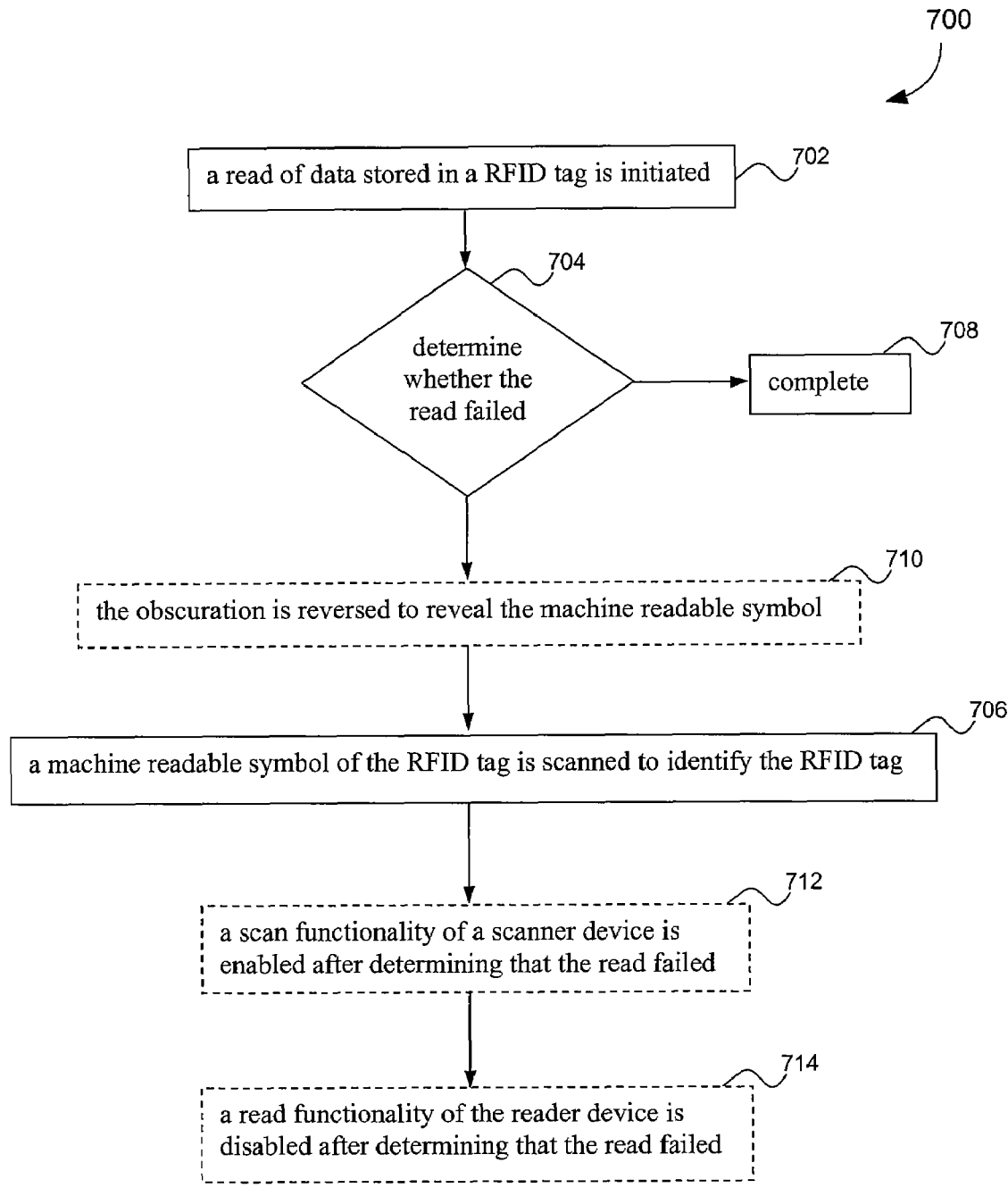
FIGS. 7-10 show flowcharts providing example embodiments of the present invention for obtaining data from tags.

Various reader operational configurations are described below that address one or more of these concerns, and/or encompass further capabilities. For example, FIG. 7 shows a flowchart 700 providing example steps for obtaining data from tags, according to example embodiments of the present invention. The steps of flowchart 700 can be performed by embodiments of the readers/scanners described herein. Other structural and operational embodiments will be apparent to persons skilled in the relevant art(s) based on the following discussion related to flowchart 700. The steps shown in FIG. 7 do not necessarily have to occur in the order shown. The steps of FIG. 7 are described in detail below.

Flowchart 700 begins with step 702. In step 702, a read of data stored in a RFID tag is initiated. For example, reader 402 of FIG. 4, reader 500 of FIG. 5, or reader 600 of FIG. 6 can initiate a read of a tag, such as tag 200 of FIG. 2, by transmitting an interrogation signal.

In decision step 704, a determination is made whether the read failed. If the read is determined to have failed, operation proceeds to step 706. For example, in embodiments, it may be determined that the read failed because a response to the read initiated in step 702 is not received within a predetermined amount of time, the expected identifying data is not received, etc. If the read is determined not to have failed, operation proceeds to step 708. In step 708, flowchart 700 is complete.

In step 706, a machine readable symbol of the RFID tag is scanned to identify the RFID tag. For example, scanner 404 of FIG. 4, reader 500 of FIG. 5, or reader 600 of FIG. 6 scan the machine readable symbol of a tag, such as machine readable symbol 302 of tag 200 shown in FIG. 3A.

In an embodiment, steps 702 and 706 are performed by a single device, such as multi-mode reader 500 shown in FIG. 5 or hand-held multi-mode reader 600 shown in FIG. 6. In alternative embodiment, steps 702 and 706 are performed by separate devices, such as by reader 402 and scanner 404 shown in FIG. 4.

As described above, in an embodiment, a reversible obscuration at least partially covers the machine readable symbol, such as obscuration 208 shown in FIG. 2. Thus, in an embodiment, flowchart 700 includes an optional step 710. In step 710, the obscuration is reversed to reveal the machine readable symbol. For example as shown in FIG. 3A, obscuration 208 was removed to expose machine readable symbol 302. In an embodiment, step 710 occurs prior to step 706. In this manner, step 706 can be performed on the machine readable symbol that is no longer obscured. In an embodiment, obscuration 208 is reversed by a human operator. Alternatively, obscuration 208 can be reversed by an automated process.

As described above, an operator may perform step 702. In an embodiment, prior to step 710, an indication to the operator may be provided on the RFID tag that the machine readable symbol is present. For example, as described above with respect to FIG. 3B, an image 304 may be present on tag 200 (or elsewhere) to provide an indication that machine readable symbol 302 is present, although partially or fully obscured by obscuration 208.

In an embodiment, after it is determined that the read of the tag failed in step 704, the RFID tag can be isolated. For example, step 702 may be performed while the tag is on a conveyor belt with other tags or while the tag is being passed through a portal. Thus, after determining that the tag failed, the tag will need to be isolated from other tags so that the machine readable symbol can be scanned (first reversing obscuration 208, if present). Because the tag did not respond to the read, it may also be desired to dispose of the isolated tag, to recycle the isolated tag, and/or replace it with another tag. Isolating the tag may be accomplished manually or in an automated fashion.

In an embodiment, after it is determined that the read of the tag failed in step 704, an operator can be alerted that the read failed. In this manner, the operator can act to reverse obscuration 208 (if present), and to scan the machine readable symbol. In an embodiment, the reader includes one or more visual indicators (e.g., lights, LEDs, GUI text) and/or audio indicators (e.g., a beeping noise) to alert the operator.

In embodiments, machine readable symbol 302 is not necessarily obscured or unreadable. (In such an embodiment, image 304 may still be present to indicate the presence of machine readable symbol 302.) In such embodiments, a reader/scanner system can be configured to ensure that machine readable symbol 302 is not fully scanned and decoded if the tag is successfully read. This embodiment can be present in a system having a separate reader and scanner, such as a system using fixed portals that read tags but do not perform scans, or can be present in a multi-mode reader system. In a system having a separate reader and scanner, the reader and scanner may be coupled by a communication link (wired or wireless) to communicate with each other, and/or may be coupled to a computer system. The computer system may be used to control their operation, and/or for sending data to and receiving data from the reader and scanner.

For a multi-mode reader, such as reader 500 of FIG. 5 or reader 600 of FIG. 6, numerous configurations are possible. In one example embodiment, a triggering event disables read capability while enabling scan capability. In another embodiment, a triggering event disables scan capability while enabling read capability.

In an embodiment, a triggering event first enables read capability, while the laser or imaging scanner circuitry is not enabled unless the read fails (such as after a predefined time period). For example, referring to FIG. 7, in an embodiment, step 706 is not performed until after step 704 is performed. Thus, in such an embodiment, flowchart 700 includes an optional step 712. In step 712, a scan functionality of a scanner device is enabled after determining that the read failed. In this manner, the enabled scanner device can perform step 706. This is an example power saving feature, where scan-related components are not powered until it is known that the machine readable symbol must be scanned.

Furthermore, after determining the read failed in step 704, the read RF circuitry may be automatically de-energized to save power. In such an embodiment, flowchart 700 includes an optional step 714. In step 714, a read functionality of the reader device is disabled after determining that the read failed in step 704. This is an example power saving feature, where read-related components are not powered again until after the scanner performs a scan of the machine readable symbol in step 706. Step 702 can then be performed on a next tag.

Additional embodiments are directed to increased operating speed (possibly at the expense of increased power usage). For example, after a triggering event leading to a read attempt, an imaging scanner could start acquiring images of the machine readable symbol. The acquired images would be ready for decode processing in the event that it is determined that the read failed. A similar operating speed advantage could be envisioned for a laser scanner, where components of the laser scanner, such as the laser and motor, are energized and brought up to a nominal scan rate while it is being determined whether the read failed.

Figure 8:
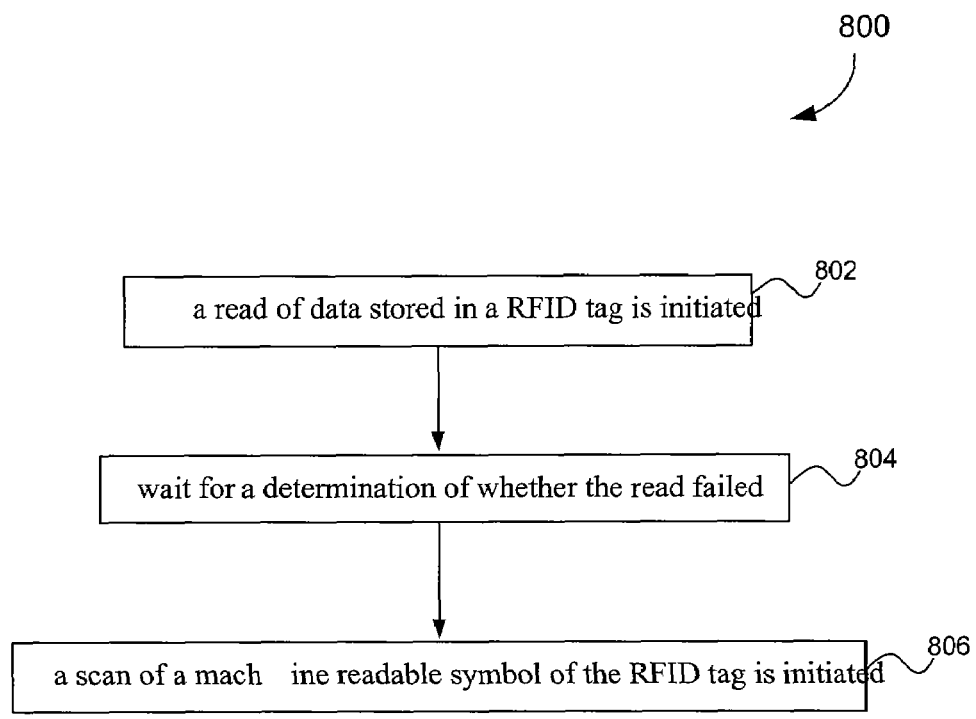

In embodiments, portions of the read of step 702 and of the scan of step 706 may be performed while the determination of step 704 is being performed. For example, FIG. 8 relates to such an embodiment. FIG. 8 shows a flowchart 800 providing example steps for obtaining data from tags, according to another example embodiment of the present invention. Other structural and operational embodiments will be apparent to persons skilled in the relevant art(s) based on the following discussion related to flowchart 800. The steps shown in FIG. 8 do not necessarily have to occur in the order shown. The steps of FIG. 8 are described in detail below.

Flowchart 800 begins with step 802. In step 802, a read of data stored in a RFID tag is initiated. For example, reader 402 of FIG. 4, reader 500 of FIG. 5, or reader 600 of FIG. 6 can initiate a read of a tag, such as tag 200 of FIG. 2, by transmitting an interrogation signal.

In step 804, a determination of whether the read failed is initiated. For example, step 804 may include starting a response timer, which will timeout (indicating a failed read) unless a response is received from the tag. If a response is received, step 804 may also include processing of the response to determine whether it is a proper response.

In step 806, a scan of a machine readable symbol of the RFID tag is initiated. For example, scanner 404 of FIG. 4, reader 500 of FIG. 5, or reader 600 of FIG. 6 can initiate a scan of the machine readable symbol of a tag, such as machine readable symbol 302 of tag 200 shown in FIG. 3A.

In the embodiment of FIG. 8, step 806 is performed before it is determined that the read failed. In other words, a scan of machine readable symbol 302 begins before it is determined that the read has failed. This is an example of a time saving feature, where if the read fails, the already initiated scan of the machine readable symbol can be completed more rapidly. For example, in an imaging scanner embodiment, an image of the machine readable symbol can be acquired before step 704 is complete. In an example laser scanner embodiment, the laser and motor of the laser scanner device can be energized before step 704 is complete, so that a scan can be more rapidly executed. Furthermore, the laser scanner device can scan the machine readable symbol before step 704 is complete.

Figure 9:
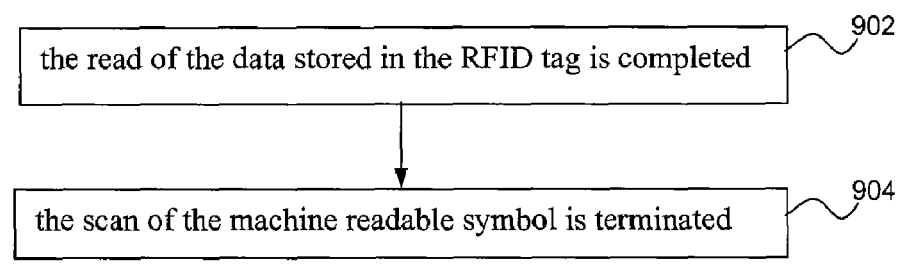

In an embodiment, the read of the tag may be successfully completed, and it is not necessary to complete the scan. In such an embodiment, flowchart 800 includes additional steps, as shown in FIG. 9. In step 902 of FIG. 9, the read of the data stored in the RFID tag is completed. In step 904, the scan of the machine readable symbol is terminated. In an embodiment, step 904 also includes discarding any data received from the scan of the machine readable symbol.

In an alternative embodiment to the steps shown in FIG. 9, the scan of the machine readable symbol is completed before completion of the read, and it is not necessary to complete the read. In such an embodiment, the read of the identifying data stored in the RFID tag can be terminated. This may include discarding any data received from the read of the identifying data.

In some embodiments, the machine readable symbol contains the same data as that encoded in the tag (or contains a functional equivalent). In such systems a multi-mode reader "accepts" the tag or machine readable symbol data, on a first-come-first-served basis. In other systems, the RFID tag may contain useful auxiliary information beyond that encoded in the machine readable symbol. In such a system, when the scan is completed first, the multi-mode reader may be configured to buffer the decoded machine readable symbol data and continue attempting to read the tag data until a timeout. In other words, the reader would be programmed to "accept" read data immediately, but would not "accept" the machine readable symbol data until and unless the read timeout expired. The buffered data may be discarded if the tag is successfully read.

Figure 10:
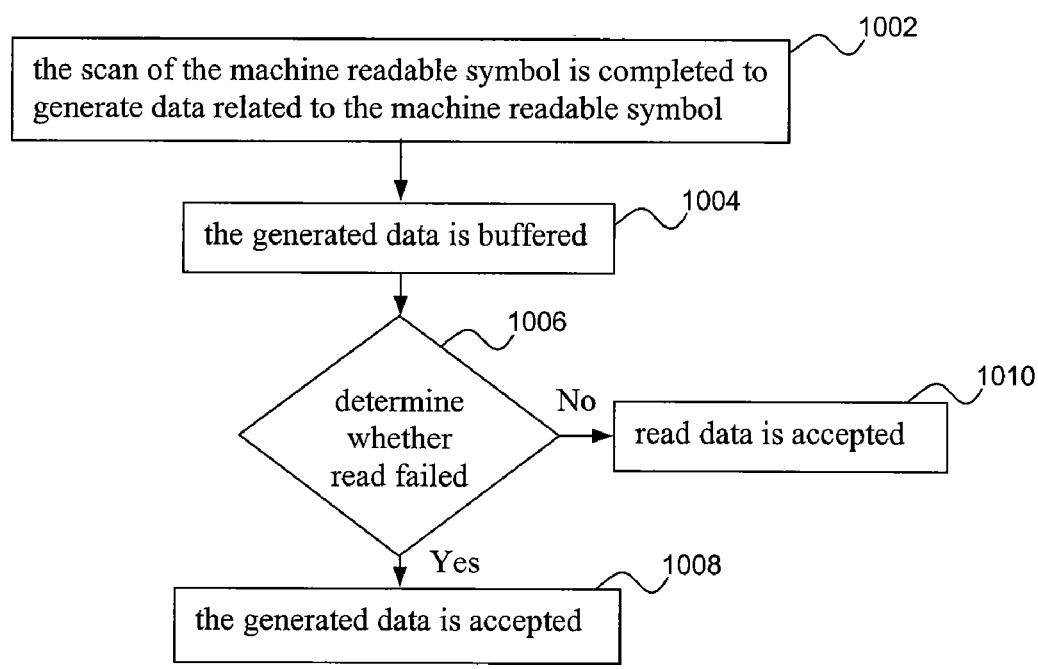

Thus, in an embodiment, flowchart 800 can include the additional steps shown in FIG. 10. In step 1002 of FIG. 10, the scan of the machine readable symbol is completed to generate data related to the machine readable symbol.

In step 1004, the generated data is buffered. For example, the generated data can be stored in a memory internal to the reader/scanner, or can be stored externally.

In step 1006, it is determined whether the read of the data stored in the RFID tag is completed within a predetermined time period. If the read is not completed within the predetermined time period, operation proceeds to step 1008. If the read is completed in time, operation proceeds to step 1010.

In step 1008, the generated data is accepted. In other words, the data is accepted as the data to be used to identify the tag and object (and/or to be used for other purpose).

In step 1010, the read data is accepted. For example, if the read is successfully completed, the generated, buffered data related to the scan may be discarded, if desired, and the data related to the tag read may be accepted.

In an alternative system, the converse may be true, and the multi-mode reader would be configured to buffer any data decoded from a tag read until after a scan timeout, but would "accept" machine readable symbol data immediately upon decoding it. Thus, in an alternative embodiment to the steps shown in FIG. 10, the read of the data stored in the RFID tag is completed prior to completion of the scan. The read data is buffered. If the scan of the machine readable symbol is completed within a predetermined time period, the data related to the scan is accepted. If the scan is not completed in time, the data read from the tag is thus accepted.

Thus, in some embodiments, data obtainable from a tag read (read data) and data obtainable from scanning a machine readable symbol of the tag (scan data) is not compared. Because the data is not compared, a determination of whether the read data and scan data is associated is not possible.

For example, in an embodiment, only one of the read and the scan are successfully completed, so that read data and scan data cannot be compared for the tag, and thus it is unknown whether the data is associated. In one example of this described above, the machine readable symbol data associated with a tag may be obscured unless a read of the tag fails, so that only one of the read data and scan data can be obtained. In another embodiment, a read and a scan are both completed, but the data received from one of the read and scan is discarded prior to making a comparison, so that it cannot be determined whether the read data and scan data are associated.

An advantage of the embodiments described herein includes a reduced risk of increased bandwidth from transmitting or processing duplicate data (from both a scan and read). Furthermore, the difficulties of managing mismatched tag read and scan data are avoided.

Conclusion

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A radio frequency identification (RFID) tag device, comprising:
   a substrate;
   an antenna on the substrate;
   an electrical circuit on the substrate that includes identifying data for the RFID tag device, wherein the electrical circuit is coupled to the antenna and backscatter transmits the identifying data in response to a request from a reader;
   a machine readable symbol associated with the RFID tag device; and
   a reversible obscuration that at least partially prevents the machine readable symbol from being decoded.

2. The RFID tag device of claim 1, wherein the reversible obscuration comprises at least one of an opaque material overlay, a scratch-off coating, a pull-away tab, a heat activated ink, a chemically activated ink, or a removable ink.

3. The RFID tag device of claim 1, wherein the reversible obscuration is reversible by application of at least one of a chemical or heat.

4. The RFID tag device of claim 1, wherein the machine readable symbol includes at least one of a linear barcode, a multi-row barcode, a composite code, or a matrix code.

5. The RFID tag device of claim 4, wherein the reversible obscuration is configured to hinder optical contrast for the at least one of the linear barcode, multi-row barcode, composite code, or matrix code.

6. The RFID tag device of claim 1, wherein the machine readable symbol is imbedded in a layer of the RFID tag device.

7. The RFID tag device of claim 1, further comprising: an optical indication of the presence of the machine readable symbol.

8. The RFID tag device of claim 7, wherein the optical indication includes text.

9. The RFID tag device of claim 7, wherein the optical indication includes graphics.

10. The RFID tag device of claim 1, wherein the machine readable symbol includes the identifying data for the RFID tag device.

11. The RFID tag device of claim 1, wherein the machine readable symbol includes data that is at least partially different from the identifying data for the RFID tag device that is included in the electrical circuit.

12. The RFID tag device of claim 1, wherein the machine readable symbol includes data that is indirectly related to the identifying data for the RFID tag device that is included in the electrical circuit.

13. A radio frequency identification (RFID) tag device, comprising:
    a substrate;
    an antenna coupled to the substrate;
    an integrated circuit coupled to the substrate and to the antenna, the integrated circuit including data that identifies the RFID tag device, wherein the integrated circuit transmits the data using backscatter modulation in response to a request from a reader;
    a machine readable symbol associated with the RFID tag device; and
    a reversible obscuration that prevents at least a portion of the machine readable symbol from being decoded.

14. The RFID tag device of claim 13, wherein the reversible obscuration includes at least one of an opaque material overlay, a scratch-off coating, a pull-away tab, a heat activated ink, a chemically activated ink, or a removable ink.

15. The RFID tag device of claim 13, wherein the reversible obscuration is reversible by application of at least one of a chemical or heat.

16. The RFID tag device of claim 13, wherein the machine readable symbol includes at least one of a linear barcode, a multi-row barcode, a composite code, or a matrix code.

17. The RFID tag device of claim 13, wherein the reversible obscuration is configured to hinder optical contrast of at least a portion of the machine readable symbol.

18. The RFID tag device of claim 13, further comprising:
    an optical indication that the machine readable symbol is present.

19. A radio frequency identification (RFID) tag device, comprising:
    a substrate;
    an antenna coupled to the substrate;
    an integrated circuit coupled to the substrate and to the antenna, wherein the integrated circuit includes data that identifies the RFID tag device, and wherein the integrated circuit transmits the data using backscatter modulation in response to a request from a reader;
    a machine readable symbol associated with the RFID tag device; and
    means for at least partially preventing the machine readable symbol from being decoded.

20. The RFID tag device of claim 19, further comprising:
    an optical indication that the means for at least partially preventing the machine readable symbol from being capable of being decoded is present.

* * * * *